United States Patent
Dupuis

[15] 3,681,830
[45] Aug. 8, 1972

[54] INDEXABLE CUTTING INSERTS
[72] Inventor: Hubert Dupuis, Warren, Mich.
[73] Assignee: Allegheny Ludlum Industries, Inc., Pittsburgh, Pa.
[22] Filed: Nov. 6, 1970
[21] Appl. No.: 87,532

Related U.S. Application Data
[62] Division of Ser. No. 725,445, April 30, 1968, Pat. No. 3,561,170.

[52] U.S. Cl............................................29/95, 29/105
[51] Int. Cl..........................B26d 1/00, B26d 1/12
[58] Field of Search.........29/95, 96, 103, 105, 105 A

[56] References Cited
UNITED STATES PATENTS

| | | | |
|---|---|---|---|
| 3,486,210 | 12/1969 | Greenleaf | 29/95 |
| 3,497,933 | 3/1970 | Okada | 29/105 |
| 3,116,538 | 1/1964 | Severson | 29/105 |
| 3,279,034 | 10/1966 | Kaiser | 29/95 |
| 3,279,035 | 10/1966 | Johnson | 29/95 |
| 2,278,738 | 4/1942 | Praeg | 29/103 |

*Primary Examiner*—Harrison L. Hinson
*Attorney*—Whittemore, Hulbert and Belknap

[57] ABSTRACT

Indexable cutting inserts having a multiplicity of successively usable cutting edges, the inserts having preground areas of circular cross-section formed by spin grinding directly in the rear of all of the cutting edges.

8 Claims, 15 Drawing Figures

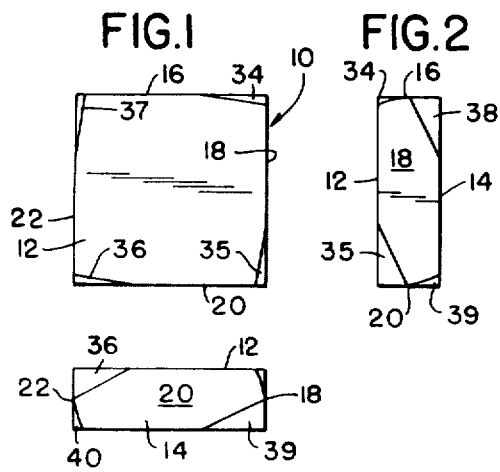
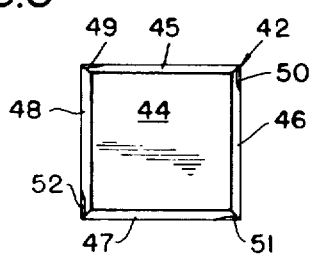
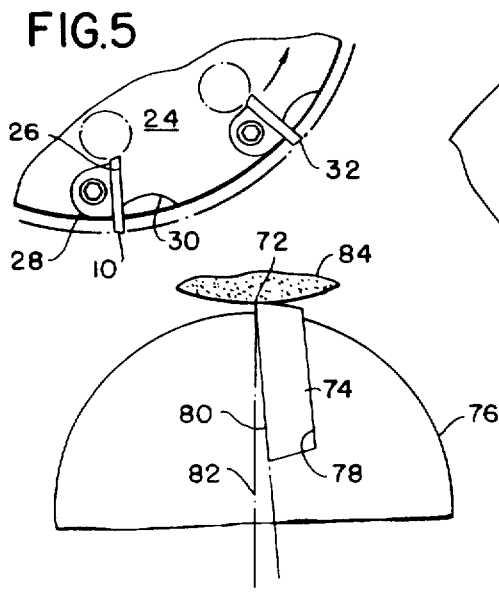
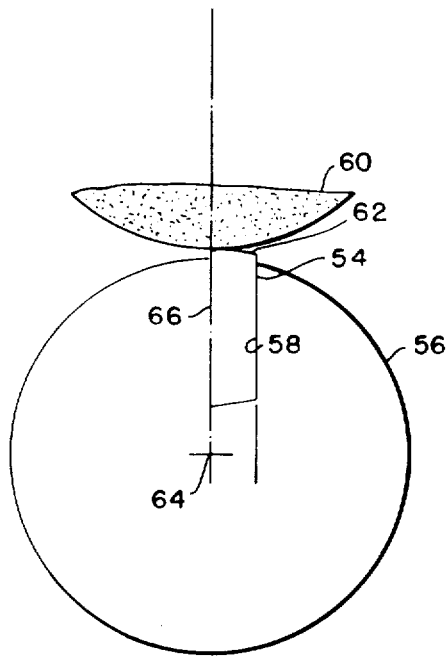
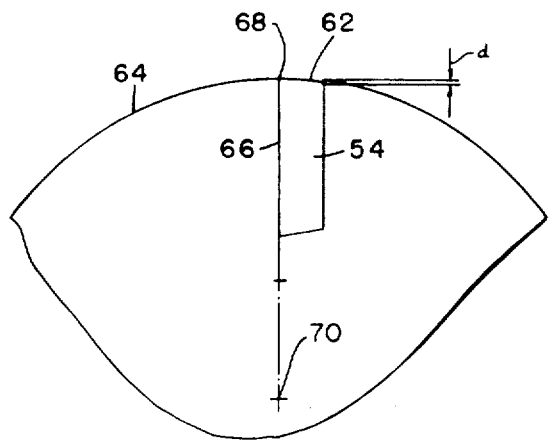
INVENTOR
HUBERT DUPUIS
BY Whittemore, Hulbert
& Belknap
ATTORNEYS

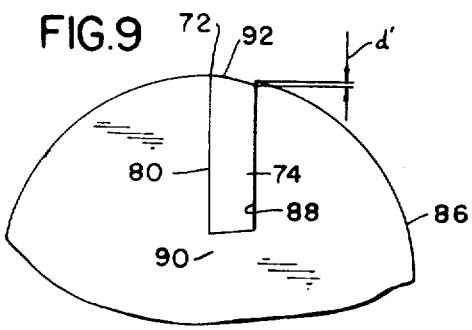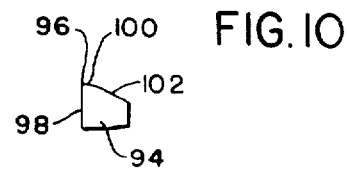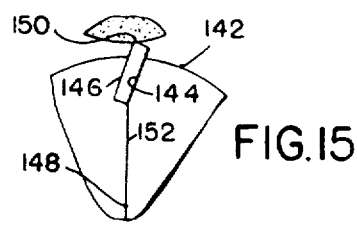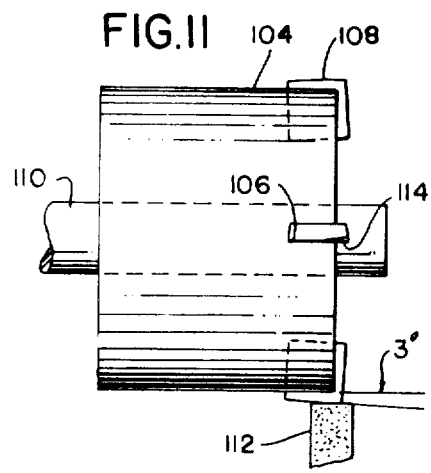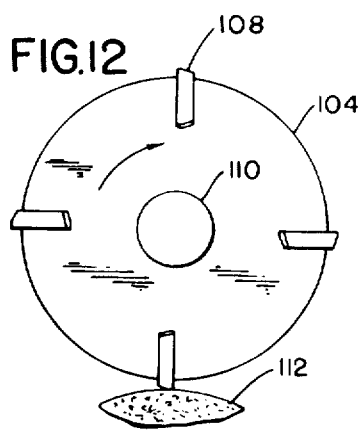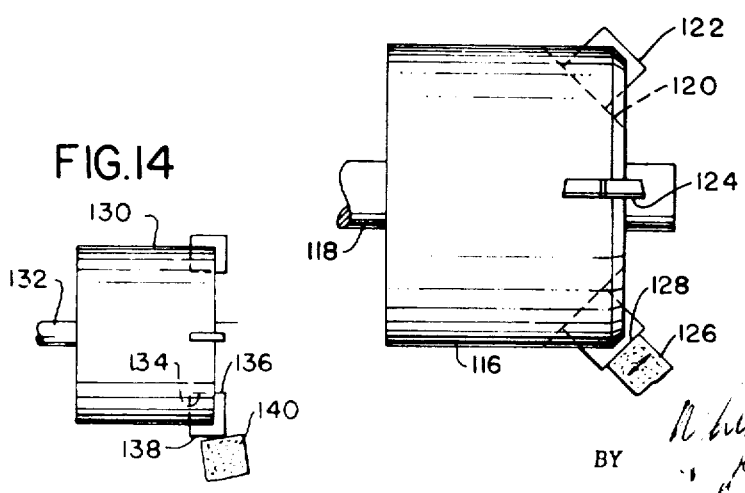

INDEXABLE CUTTING INSERTS

CROSS-REFERENCE TO RELATED APPLICATION

The present application is a division of my prior copending application Ser. No. 725,445 filed Apr. 30, 1968, now U.S. Pat. No. 3,561,170.

BRIEF SUMMARY OF THE INVENTION

In accordance with the present invention, commercially available inserts are mounted in a special rotary fixture so that clearance or relief surfaces are provided in the rear of the cutting edges by rotating the fixture relative to a grinding wheel which is either stationary or which may be oscillated to distribute the grinding action over the required area of the insert.

The cutting inserts are accurately located in the fixture which is of course formed with high precision mounting means corresponding precisely to the mounting means formed in the tool holder or body in which the inserts are subsequently to be used. The inserts are indexed and reversed if appropriate, so that each of the cutting edges on the insert is formed with a high degree of accuracy and provided with the relief or clearance surface of circular cross-section. The operation not only provides the cutting edges with the relief or clearance surfaces, but also converts inserts of commercial tolerance to high precision inserts in which the cutting edges are located with whatever degree of accuracy and precision is required.

If the inserts are ground in a fixture having the same effective radius of rotation for the cutting edges as will be employed in the cutting tool, then of course the cutting edges are provided with relief surfaces of circular cross-section, either cylindrical or conical, of limited width, the surfaces occupying the imaginary surface of rotation of the cutting edge. However, it is preferable to provide clearance in addition to the circular relief surfaces and this follows when the inserts are positioned in a fixture having a smaller effective radius than the radius at which the cutting edges will operate in the cutting tool. Similar, but specifically different results are obtained when providing clearance in back of the cutting edge when the inserts are spun-ground in a fixture which, while having the same effective radius as the tool holder or body, positions the inserts at an angle different from the angle at which they will be positioned in the cutting tool holder or body. Obviously, both the different radius and inclination may be combined simultaneously in a single operation.

BRIEF DESCRIPTION OF THE DRAWINGS

FIG. 1 is a front view of an indexable insert constructed in accordance with the present invention.

FIG. 2 is a side view of the insert as seen from the right in FIG. 1.

FIG. 3 is a side view of the insert as seen from the front in FIG. 1.

FIG. 4 is a view similar to FIG. 1, showing a prespun insert of positive rake type.

FIG. 5 is a fragmentary diagrammatic view showing the manner in which the inserts are mounted on a cutter body.

FIG. 6 is a diagrammatic view illustrating the relationship of an insert in a special grinding fixture and a grinding wheel.

FIG. 7 is a diagrammatic view similar to FIG. 6, showing the relationship between a pre-spun ground insert when mounted in a cutter body of larger diameter than the fixture in which the insert was ground.

FIG. 8 is a view similar to FIG. 6 showing an insert mounted in a grinding fixture at an angle different from the angle at which the insert is to be used.

FIG. 9 is a diagrammatic view showing the relationship of the insert as ground in FIG. 8, when positioned in a tool body of the same diameter as the grinding fixture but at a different angle.

FIG. 10 is a fragmentary end edge view of an insert showing a relief or clearance surface of limited width provided in rear of the cutting edge.

FIG. 11 is a view showing a grinding fixture having a plurality of indexable inserts for grinding relief or clearance surfaces of circular cross-section in rear of a relatively short cutting edge located adjacent a corner of the insert.

FIG. 12 is a front elevational view of the arrangement shown in FIG. 11.

FIG. 13 is a view similar to FIG. 11 showing the provision of relief or clearance areas of conical configuration.

FIG. 14 is a view similar to FIG. 11 showing a modified method of producing relief or clearance of circular cross-section.

FIG. 15 is a fragmentary view similar to FIG. 12 showing the appropriate inclination of a reversible or cubical insert to provide appropriate relief in rear of the cutting edges.

DETAILED DESCRIPTION

Referring first to FIGS. 1–5 there is shown in FIG. 1 an indexable blade or insert 10 which may be formed of a suitable hard cutting material such for example as tungsten carbide. The indexable insert 10 illustrated in FIGS. 1–3 is a flat body having planar side surfaces 12 and 14 and planar edge surfaces 16, 18, 20 and 22. Indexable inserts of this type may be square as indicated, triangular, pentagonal, hexagonal, or other shapes including circular cross-section. The present invention however, is directed to inserts having cutting edges formed by the intersection of one or both of the flat side surfaces with the edge surfaces modified as hereinafter disclosed.

It will be understood that in use the cutting inserts such as the inserts 10, are mounted in a rotary holder or tool body 24 having recesses 26 in which the inserts are received and in which they are clamped in operating position by suitable clamping means such for example as wedge means illustrated at 28 in FIG. 5. The direction of rotation of the holder 24 is indicated by the arrow and it will be observed that in front of the cutting insert there is provided a recess 30 which receives chips from the cutting operation. With the parts as illustrated in FIG. 5, it will be observed that a cutting edge is provided generally at 32 which is formed by the intersection between the front surface of the insert which may be the surface 12 or 14, and an edge surface thereof which may be the edge surface 16, 18, 20 or 22, the cutting edge being modified as hereinafter described.

Where the edges 16, 18, 20 and 22 are perpendicular to the side surfaces 12 and 14, it will be understood that the insert is not only indexable, but is also reversible, thus the square insert illustrated in FIG. 1 has eight successively usable cutting edges. With this insert it will be observed that the included angle of the cutting edge between the surfaces 12 or 14 on the one hand, and 16, 18, 20 or 22 on the other hand, is 90°. Accordingly, an insert of this type requires positioning in a rotary holder so that a condition of zero or negative rake exists. In other words, referring to FIG. 5, the front surface of the insert 10 must either be radial with respect to the cutter body, in which case a condition of zero rake exists; or it must be inclined rearwardly in the direction of rotation, in which case a condition of negative rake exists.

In practice it is found that much superior results are obtained when the surface directly in rear of the particular cutting edge in use is a relief or clearance surface of circular cross-section, either cylindrical or conical, dependent upon the arrangement of the insert in the holder. In some cases the surface of circular cross-section directly in rear of the cutting edge may have a radius of curvature equal to the radius of curvature of the imaginary surface generated by the cutting edge upon rotation of the tool. In other words, the surface of circular cross-section directly in rear of the cutting edge may occupy the cylindrical or conical imaginary surface traced by the cutting edge upon rotation of the tool.

Preferably however, the surface of circular cross-section directly in rear of the cutting edge is in clearance or diverges inwardly from the imaginary surface generated by the cutting edge upon rotation of the cutter. This clearance may result from the fact that the surface of circular cross-section has a radius of curvature smaller than the radius of the circular path generated by the cutting edge upon rotation of the tool. Alternatively, the clearance may result from the fact that the surface of circular cross-section, while having a radius of curvature equal to the radius of the path generated by the cutting edge during rotation of the tool, nevertheless diverges inwardly because of inclination of the insert, and more specifically because the center of curvature of the surface of circular cross-section lies forwardly of a line joining the cutting edge to the axis of the holder or tool body.

While it is perfectly feasible to modify inserts and to employ them in cutters so that the surface of circular cross-section in rear of the cutting edge occupies an entire edge surface of an insert, it is more usual to limit the circular cross-section relief or clearance surface to a relatively narrow band directly in rear of the cutting edge. Moreover, in many applications only a portion of an available cutting edge is used; namely, the portion adjacent one corner of the insert.

Referring again to FIGS. 1–3, the insert 10 has a total of eight clearance or relief surfaces of circular cross-section located directly in rear of cutting edges, four of these surfaces being indicated in FIGS. 1–3 at 34, 35, 36 and 37. It will be observed that these areas are generally triangular in outline. It will be appreciated that four identical relief or clearance surfaces of circular cross-section are provided which intersect the opposite side 14 of the insert, two of these being visible in FIG. 2 at 38 and 39, and an additional one being visible in FIG. 3 at 40. The exact shape and arrangement of these relief or clearance surfaces will become more apparent in conjunction with a description of the method of forming these surfaces.

Referring now to FIG. 4 there is shown an insert 42 having a flat surface 44 at one side parallel to a similar flat surface at the opposite side, and provided with four inclined edge surfaces 45, 46, 47 and 48. The side edges 45, 46, 47 and 48 converge as indicated in FIG. 4 so that the insert is in the form of a relatively thin normal section of a pyramid. In this type of insert the cutting edges are characterized in that they have acute included angles, and accordingly, they are capable of being used in cutters with positive rake. However, with this type of cutter, only four sequentially usable cutting edge portions are available. As seen in FIG. 4, corner portions of the edge surfaces 45, 46, 47 and 48 are spun ground to provide relief or clearance surfaces 49, 50, 51 and 52 which extend rearwardly from cutting edges. The cutting edges after modification of course, are defined by the intersection between the adjacent flat side surface and the modified edge surface portion which has been formed to circular cross-section, either cylindrical or conical.

Referring now to FIG. 6 there is illustrated the manner in which a cutting insert 54 is spun ground. The insert is illustrated as located in a grinding fixture or holder 56 having a plurality of recesses 58 in which the inserts 54 are received in accurately located position. The fixture 56 is rotatable and of circular cross-section so that an edge portion or a part of an edge portion of the insert 54 extends radially beyond the holder into position to be engaged by the periphery of a grinding wheel 60. The edge surface 62 of the insert 54, or a portion thereof, is ground to circular cross-section by rotation or oscillation of the holder, causing the edge portion 62 of the insert to move in a circular path past the peripheral surface of the grinding wheel. It will be apparent that this operation forms the edge surface 62 or a portion thereof to a cylindrically formed surface having an axis or center of curvature at 64 which is the axis of rotation of the holder 56. It is to be observed that in the illustrated arrangement the front surface 66 of the insert occupies a plane radial with respect to the fixture 56.

It will of course be understood that the production of the pre-spun ground inserts involves suitable indexing of the insert 54 so that all of the cutting edge portions thereof which are to be used are provided with the relief or clearance area directly in rear of the cutting edge. It will further be observed that irrespective of any dimensional irregularities in the insert prior to spin grinding, there will be produced an insert after it has been spun ground in which the cutting edges are located with a high degree of accuracy with respect to the locating recess or pocket in which they are mounted in use.

Referring now to FIG. 7 there is diagrammatically illustrated the manner in which the spun ground surface provided on the edge 62 of the insert 54 affords clearance when it is mounted in a tool body or holder of a diameter greater than that of the grinding fixture 56. In this Figure, the portion of the circle indicated at 64 may be considered as the imaginary surface generated by the cutting edge 68 upon rotation of a holder or cutter body having an axis of rotation at 70. Assuming that the front surface 66 of the insert is caused to occupy a plane radial to the cutter, then the clearance in rear of the cutting edge 68 increases from the cutting edge to the trailing edge by an amount indicated at $d$.

It will of course be understood that in FIG. 7 there is no attempt to show a holder such as the holder 24 of FIG. 4, but only to indicate the geometry involved.

Referring now to FIG. 8 there is illustrated a somewhat different procedure in providing a clearance or relief surface of circular cross-section directly in rear of a cutting edge designated 72 provided on an insert 74. Here, the grinding fixture indicated at 76 is provided with a locating recess 78 such that the insert 74 is inclined from the position which the insert 54 occupies in FIG. 6. In other words, the front surface 80 of the insert does not occupy the radial plane 82 of the fixture body. With a plurality of inserts carried by the fixture 76 in the same position as illustrated for the insert 74, the grinding fixture 76 is rotated to cause the cutting edges 72 of the insert 74 to traverse the grinding wheel 84, thus forming surfaces of circular cross-section, and in the embodiment illustrated, surfaces which are cylindrical, as a result of contact with the grinding wheel. Again, it is stressed that the actual area formed to circular cross-section directly in rear of the cutting edge may be a relatively narrow surface such for example as from 0.005 to 0.125 inch.

Referring now to FIG. 9 the manner in which the clearance is introduced by suitable mounting of the modified insert 74 as produced by the setup illustrated in FIG. 8, is shown. Here, while the circle 86 indicates that the circular path traversed by the cutting edge has substantially the same diameter as the diameter of the grinding fixture 76, clearance results from the fact that the pockets or seats 88 formed in the cutter body position the inserts 74 at a different angle from the angle which they occupy in the grinding fixture. Thus, as seen in FIG. 9, the front surface 80 of the insert 74 in the cutter body, occupies a radial plane 90 thereof. Accordingly, the relieved edge surface 92 provides increasing clearance from the cutting edge 72 rearwardly to the trailing edge by an amount designated $d'$.

In FIG. 10 there is illustrated a portion of an insert 94 having a cutting edge 96 provided by the intersection of the front surface 98 and the surface 100 which is of circular cross-section and is directly in rear of the cutting edge. In this Figure the edge surface 102 is the flat unmodified edge surface initially provided on the insert. This Figure illustrates that the cylindrical or conical curvature provided in rear of the cutting edge may extend for only a very short distance rearwardly therefrom.

Referring now to FIGS. 11 and 12 there is illustrated a somewhat different arrangement of providing the cutting edges, and this in fact is the arrangement which would be employed in producing the modification of insert illustrated in detail in FIG. 4. Here, a rotary grinding fixture 104 is provided having a plurality of recesses or seats 106 for receiving inserts 108 which are of the positive rake type having four cutting edges located only at one side of the insert. As best seen in FIG. 11, the inserts are slightly inclined as for example at an inclination angle of approximately 3°. The grinding fixture is rotated about the axis of drive shaft 110 and a grinding wheel 112 is provided, the axis of which is parallel to the axis of the drive shaft 110. Accordingly, as the inserts are spun by the fixture 104, the grinding wheel contacts only the limited areas 114 and form these areas into cylindrical surfaces the center of curvature of which coincides with the axis of the shaft 110.

Referring now to FIG. 13 there is illustrated a somewhat different setup for spin grinding inserts intended for use in holders or cutter bodies for the purpose of angle cutting, chamfering, or the like. In this case a rotary grinding wheel fixture 116 is provided rotatable about the axis of shaft 118. The fixture is provided with a multiplicity of insert locating seats 120 which as illustrated, position the inserts 122 with cutting edge portions thereof 124 to extend at a substantial angle as for example 45°, to the axis of the shaft 118. The grinding wheel 126 is provided in the position shown, rotatable about an axis parallel to its periphery 128. The grinding wheel may if desired be of a width equal to the length of the edge of the insert or it may be narrower as shown and reciprocated back and forth in the direction of the arrow to extend its grinding action from end to end of the edge of the insert.

Referring now to FIG. 14 there is illustrated yet another variation in setup for spin grinding the inserts. In this Figure the grinding fixture is indicated at 130 and is rotatable about the axis of shaft 132. A plurality of locating seats 134 are provided for receiving inserts 136, the inserts being positioned with an outer cutting edge 138 thereof parallel to the axis of the shaft 132. In order to spin grind a portion of the edge to provide a surface of circular cross-section directly in rear of the cutting edge, the grinding wheel 140 is provided at the inclination shown so that its periphery extends at a small angle, as for example, a few degrees, with respect to the edge surface 138 of the insert.

Referring now to FIG. 15 there is shown the arrangement necessary to provide for a clearance or relief surface in the rear of cutting edges provided on an insert designed for zero or negative rake operation. By this, reference is made to an insert in which the included angle between the front operating face of the insert and the edge surface, suitably relieved, is 90°. In this case the arc 142 may be representative of a peripheral portion of a grinding fixture having inclined seats or recesses 144 into which a plurality of zero or negative rake inserts 146 are positioned. The center of curvature of the grinding fixture is indicated at 148 and a radial plane passing through the cutting edge 150 of the insert which is undergoing treatment is indicated at 152. It will of course be understood that if the insert 146 is square, it will provide eight cutting edges each of which must be spun ground in a separate operation.

Having provided the clearance or relief surface of circular cross-section in rear of the cutting edges 150 on the insert 146, the insert may be mounted with the same or greater angularity with reference to a radial plane in a cutter or holder of the same diameter as the grinding fixture 142. It may be mounted with less angularity if mounted for use in a cutter or holder body having a greater diameter.

In the foregoing, the detailed description has referred to indexable cutting inserts mounted directly in recesses formed in the tool body. The present invention is equally applicable to inserts which are received in cartridges, and the cartridges are mounted in the tool body. Cartridges of the type referred to are disclosed in my U.S. Pat. No. 3,371,394.

From the foregoing it will be apparent that the invention resides particularly in initially forming commercial inserts with relief or clearance areas directly in rear of the cutting edges thereon in an operation which avoids the necessity for grinding assembled inserts in a cutter body, and which at the same time provides inserts of high accuracy from merely commercially variable inserts by grinding operations performed in a grinding fixture of the required accuracy. This of course requires only that the cutter body have the requisite accuracy provided in its insert or cartridge locating seats or pockets.

From the foregoing it will be noted that the invention is characterized particularly in that the edges of the inserts (as opposed to the flat parallel side surfaces) are modified by being ground to provide a surface of revolution located directly in rear of the cutting edges defined by the intersection between the generally flat edge surfaces and a flat side surface. These surfaces of revolution have the generating axis thereof located in or parallel to and spaced slightly from the plane occupied by the flat side surface of the insert, and located beyond the edge or edges of the insert opposite to the cutting edge adjacent which the surface of revolution is provided. Thus, in the simplest possible case, as illustrated in FIG. 6, the axis 64 of the relieved surface of revolution in rear of the cutting edge extends in the plane of the front face 66 thereof. In FIG. 8 the generating axis of the surface of revolution is parallel to the plane 80 containing the forward cutting face of the insert 74. As a result of the foregoing it will be observed that in all cases, including the case illustrated in FIG. 13 in which the surface of revolution generated during the spin grinding is conical, that the surface of revolution is of substantially arcuate cross-section in a plane intersecting the particular cutting edge and perpendicular to the axis about which the cutting insert rotates while performing the cutting operation.

From the foregoing description it will of course be apparent that a set of identical and interchangeable cutting inserts is provided, each of which has a properly relieved cutting edge adjacent each of its corners, the cutting edge having a flat side of the insert as its cutting face and the relieved surface immediately in rear of the cutting edge being the surface of revolution provided as described herein.

What I claim as my invention is:

1. A pre-spun ground indexable cutting insert having opposed flat parallel side surfaces and a plurality of generally flat intersecting edge surfaces, the intersection between a flat side surface and one of the edge surfaces defining a cutting edge, the flat side surface constituting the cutting face of the insert for said cutting edge, the said one edge surface constituting the relief or clearance surface thereof, the improvement which comprises providing that portion of the edge surface directly in rear of the cutting edge which constitutes the relief or clearance surface for the aforesaid cutting edge in the form of a surface of revolution about an axis at least closely adjacent to the plane occupied by the said cutting face and spaced beyond the edge or edges of said insert opposite to the edge surface thereof whose intersection with the cutting face defines the aforesaid cutting edge, said surface of revolution being of substantially arcuate cross-section in a plane intersecting the said cutting edge and generally perpendicular to the axis about which said insert is rotated when said cutting edge is in cutting position, and providing cutting clearance directly in rear of said cutting edge.

2. An insert as defined in claim 1 in which the surface of revolution is cylindrically formed.

3. An insert as defined in claim 1 in which the surface of revolution is conically formed.

4. An insert as defined in claim 1 in which the insert is rotated about an axis to cause the cutting edge to generate an imaginary surface of circular cross-section, and in which the surface of revolution diverges inwardly rearwardly of the cutting edge from such imaginary surface.

5. An insert as defined in claim 1 in which the said surface of revolution extends along the edge surface of the insert from a corner thereof to a point intermediate adjacent corners of the insert.

6. An insert as defined in claim 5 in which the surfaces of circular cross-section are generally triangular in outline.

7. An insert as defined in claim 1 in which each corner of the insert is provided at one side thereat with an identical surface of revolution modification of the edge surface thereof.

8. An insert as defined in claim 1 in which the edge surfaces of the insert occupy planes intersecting both side surfaces thereof at right angles, and in which each corner of the insert is provided at both sides thereof with an identical surface of revolution modification of the edge surface thereof.

* * * * *